United States Patent
Morell et al.

(10) Patent No.: US 7,263,454 B2
(45) Date of Patent: Aug. 28, 2007

(54) METHOD FOR MONITORING A VIBRATING GYROSCOPE

(75) Inventors: Heinz-Werner Morell, Kaiserslautern (DE); Dietmar Schmid, Villmar (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/562,806

(22) PCT Filed: Jun. 1, 2004

(86) PCT No.: PCT/EP2004/050970
§ 371 (c)(1),
(2), (4) Date: Dec. 29, 2005

(87) PCT Pub. No.: WO2005/001379
PCT Pub. Date: Jan. 6, 2005

(65) Prior Publication Data
US 2006/0142958 A1    Jun. 29, 2006

(30) Foreign Application Priority Data
Jun. 30, 2003    (DE) .............................. 103 29 508

(51) Int. Cl.
*G01F 17/00*    (2006.01)
(52) U.S. Cl. ......................................... 702/116; 702/56
(58) Field of Classification Search ................ 702/145, 702/116, 117, 182, 104, 56–69, 72, 106, 107, 702/130, 190, 193, 96, 142, 75; 73/494, 73/503.3, 504.12
See application file for complete search history.

(56) References Cited

U.S. PATENT DOCUMENTS

| | | | | |
|---|---|---|---|---|
| 5,313,835 A | * | 5/1994 | Dunn | ....................... 73/514.15 |
| 5,826,204 A | * | 10/1998 | Ulm | ............................... 701/1 |
| 2005/0257596 A1 | * | 11/2005 | Fell et al. | ..................... 73/1.37 |

FOREIGN PATENT DOCUMENTS

JP        09-218040        8/1998

* cited by examiner

*Primary Examiner*—Bryan Bui
(74) *Attorney, Agent, or Firm*—Cohen Pontani Lieberman & Pavane LLP

(57) ABSTRACT

The invention relates to a method for monitoring a vibrating gyroscope which represents a resonator and forms part of at least one control loop that excites the vibrating gyroscope with its natural frequency by supplying an excitation signal. An output signal can be extracted from the vibrating gyroscope, the excitation signal being derived from said output signal by means of filtering and amplifying. According to the invention, the quality of the resonator is measured. If the measured quality is below a threshold value, an error message is generated.

4 Claims, 2 Drawing Sheets

METHOD FOR MONITORING A VIBRATING GYROSCOPE

CROSS-REFERENCE TO RELATED APPLICATIONS

This is a U.S. national stage of application No. PCT/EP2004/050970, filed on 1 Jun. 2004. Priority is claimed on the following applications: Country: Germany, Application No.: 103 29 508.9, Filed: 30 Jun. 2003.

BACKGROUND OF THE INVENTION

The invention relates to a method for monitoring a vibration gyro, which represents a resonator and is part of at least one control loop which excites the vibration gyro by supplying an excitation signal at its natural frequency, in which case an output signal can be tapped off from the vibration gyro, from which the excitation signal is derived by filtering and amplification.

By way of example, EP 0 461 761 B1 has disclosed rotation rate sensors in which a vibration gyro is stimulated on two axes which are aligned radially with respect to a main axis, for which purpose a primary and a secondary control loop are provided, with corresponding transducers, on the vibration gyro. When rotation rate sensors such as these are used in vehicles in order to stabilize the vehicle motion, dangers can occur as a result of failure or a malfunction. In order to prevent this, functional monitoring of the rotation rate sensor is required. This takes account of the fact that the vibration gyro is arranged in an evacuated housing in order to achieve the least possible damping, and that air can enter the housing as a result of ageing or a direct, reducing or precluding the usefulness of the vibration gyro.

In the case of JP 09-218040 A, monitoring such as this is carried our by the measuring the Q-factor of the resonator and by producing a fault message if the Q-factor is below a threshold value. In this case, the Q-factor is measured by switching off the excitation signal and by evaluating the amplitude of the the excitation signal in order to produce the fault message. The known method is essentially suitable for carrying out a test when the vehicle is stationary, for example in each case after switching on the ignition or during the checking of the rotation rate sensor during the course of manufacture.

SUMMARY OF THE INVENTION

The method according to the invention is also suitable for a test during operation and comprises an additional phase shift of the excitation signal being inserted temporarily into the control loop, and any frequency change caused by this being evaluated. It depends on the individual situation whether a temporary phase shift in the excitation signal or a temporary frequency change will interface with evaluation of the rotation rate signal for the respectively intended purpose.

This embodiment is particularly suitable for a digital implementation of the control loop, in that, after amplification and analog/digital conversion, the output signal is demodulated to an in-phase component and a quadrature component, in that the quadrature component modulates a carrier, after filtering, which carrier is supplied as an excitation signal to the vibration gyro, in that the in-phase component is supplied, after filtering, to a PLL circuit, which controls the frequency and the phase of the carrier, in that a signal which corresponds to the frequency change is supplied to the PLL circuit in order to shift the phase of the excitation signal, and causes a phase change in the carrier.

The invention can preferably be refined in such a way that the phase shift is approximately 10° with respect to the carrier.

BRIEF DESCRIPTION OF THE DRAWINGS

The invention allows numerous exemplary embodiments. One of these is illustrated schematically in the drawing with reference to a number of figures, and will be described in the following text. In the figures.

DETAILED DESCRIPTION OF THE PREFERRED EMBODIMENTS

The exemplary embodiment as well parts of them are admittedly illustrated in the form of block diagrams. However, this does not mean that the arrangement according to the invention is restricted to an implementation with the aid of individual circuits corresponding to the blocks. The arrangement according to the invention can in fact be implemented in a particularly advantageous manner with the aid of large-scale-integrated circuits. In this case, microprocessors can be used which, when suitably programmed, carry out the processing steps illustrated in the block diagrams.

Figure 1:
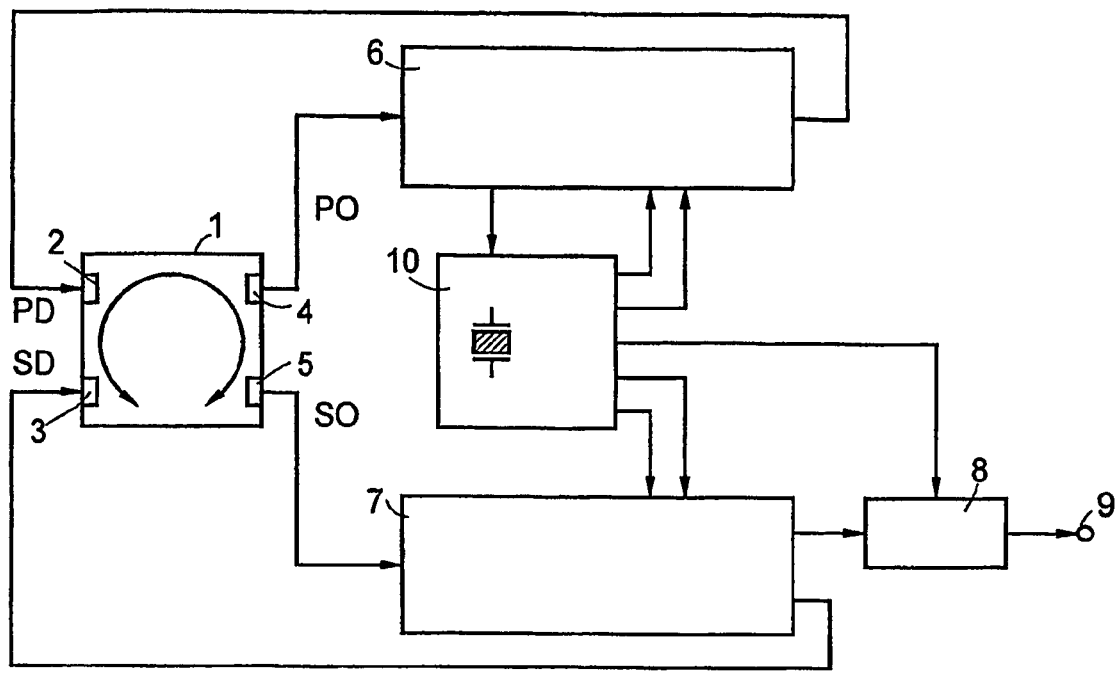
FIG. 1 shows a block diagram of a rotation rate sensor.

FIG. 1 shows a block diagram of an arrangement having a vibration gyro 1 with two inputs 2, 3 for a primary excitation signal PD and a secondary excitation signal SD. Suitable transducers, for example electromagnetic transducers, are used for excitation purposes. The vibration gyro also has two outputs 4, 5 for a primary output signal PO and a secondary output signal SO. These signals reflect the respective vibration at spatially offset points on the gyro. Gyro such as these are known, for example, from EP 0 307 321 A1 and are based on the Coriolis force effect.

The vibration gyro 1 represents a high Q-factor filter, with the path between the input 2 and the output 4 being part of a primary control loop 6, and the path between the input 3 and the output 5 being part of a secondary control loop 7. The primary control loop 6 is used for excitation of oscillations at the resonant frequency of the vibration gyro of, for example, 14 kHz. The excitation in this case is applied on one axis of the vibration gyro, with the oscillation direction that is used for the secondary control loop being offset through 90° with respect to this. The signal SO is split in the secondary control loop 7 into two components, one of which is passed via a filter 8 to an output 9, which a signal which is proportional to the rotation rate can be tapped off.

A major proportion of the signal processing is carried out in digital from in both control loops 6, 7. The clock signals which are required for signal processing are produced in a crystal-controlled digital frequency synthesizer 10, whose clock frequency in the illustrated example is 14.5 MHz. The application of the method according to the invention is based primarily on the use of the primary control loop for which reason FIG. 3 illustrates one exemplary embodiment of the primary control loop.

Figure 2:
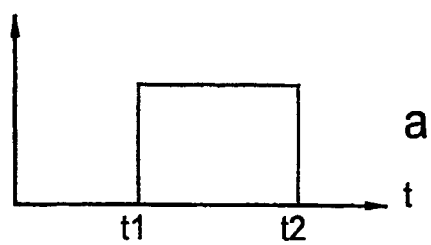
FIG. 2 shows timing diagrams of signals for the exemplary embodiment.
Figure 2:
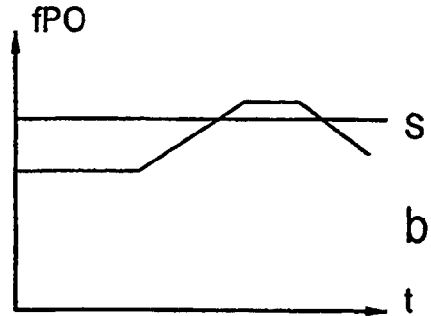

In the exemplary embodiment, a switching signal that is shown in FIG. 2a introduces an additional phase shift between the times t1 and t2. In order to maintain the resonance conditions, the control loop reacts by a change in the frequency fPO, as is illustrated in FIG. 2b. In this case, if the frequency change exceeds a threshold value S, the Q-factor of the vibration gyro is sufficiently high. If, in contrast, the frequency change is less, then there is high damping, so that a fault message is triggered.

Figure 3:
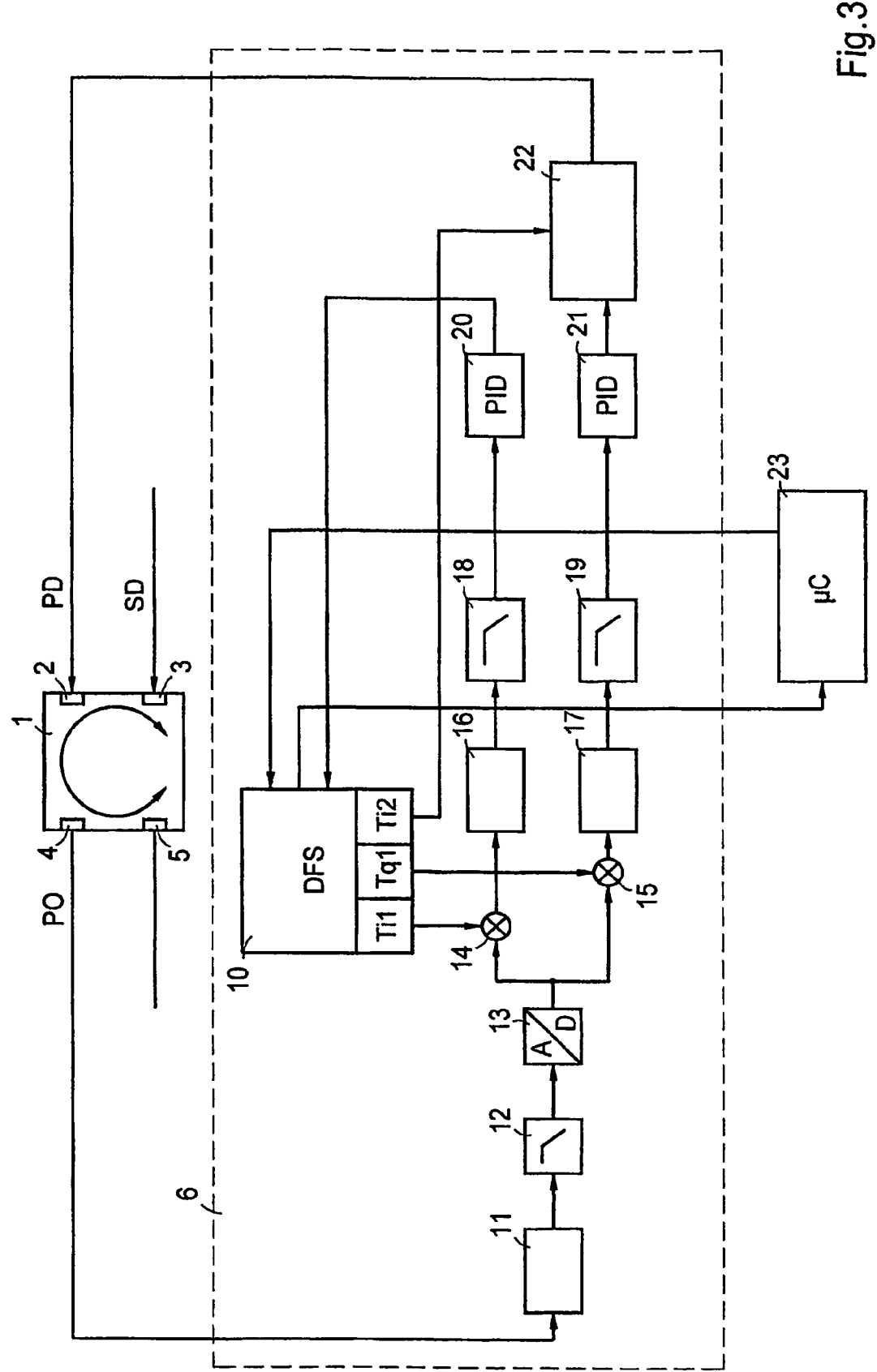
FIG. 3 shows block diagram of a rotation rate sensor which is designed to carry out a method according to the exemplary embodiment.

The primary control loop which is illustrated in FIG. 3 has an amplifier 11 for the output signal PO, to which an antialiasing filter 12 and an analog/digital converter 13 are connected. Splitting into an in-phase component and a quadrature component is carried out with the aid of multipliers 14, 15, to which carriers Ti1 and Tq1 are supplied. Both components then pass through a respective (sinx/x) filter 16, 17 and a low-pass filter 18, 19. The filtered real part is supplied to a PID regulator 20, which controls the digital frequency synthesizer, as a result of which a phase control circuit is closed, which produces the correct phase angle for the carriers Ti1 and Tq1. Furthermore, a carrier Tq2 is produced and is modulated in a circuit 22 with the output signal from a further PID regulator 21, which receives the low-pass-filtered imaginary part. The output signal from the circuit 22 is supplied to the input 2 of the vibration gyro 1 as the excitation signal PD.

A microcomputer 23 controls, in addition to other processes, the measures which are required to carry out the method according to the invention. For this purpose, the microcomputer 23 passes a signal corresponding to that shown in FIG. 2a to the frequency synthesizer, which produces an additional phase shift. The reaction of the phase locked loop comprises the frequency synthesizer selecting a different division from the clock frequency in order to change the frequency of the carriers. This can be supplied as a measure of the frequency discrepancy to the microcomputer 23, which then carriers out the evaluation process as explained in conjunction with FIG. 2.

What is claimed is:

1. A method for monitoring a vibration gyro which represents a resonator and is part of at least one control loop, the vibration gyro being excited by an excitation signal generated by the at least one control loop at a natural frequency of the vibration gyro, said method comprising the steps of:
    tapping an output signal from which the excitation signal is derived by filtering and amplification;
    inserting an additional phase shift of the excitation signal into the at least one control loop;
    evaluating a Q-factor of the output signal caused by the additional phase shift;
    determining whether the Q-factor of the vibration gyro is sufficiently high by the determining whether the Q-factor is above a threshold value; and
    triggering a fault signal if the Q-factor of the vibration gyro is determined to be below the threshold value, thereby indicating that said Q-factor is insufficiently high.

2. The method of claim 1, further comprising the steps of:
    demodulating the output signal to an in-phase component and a quadrature component, after amplification and analog/digital conversion of the output signal;
    modulating, by the quadrature component, a carrier after filtering of the quadrature component;
    supplying the modulated carrier as the excitation signal to the vibration gyro;
    supplying, after filtering, the in-phase component to a PLL circuit that controls the frequency and phase of the carrier; and
    supplying a signal corresponding to the frequency change to the PLL circuit to shift the phase of the excitation signal and cause a phase change in the carrier.

3. The method of claim 2, wherein the phase shift with respect to the carrier is approximately 10°.

4. The method of claim 1, wherein said step of evaluating a Q-factor comprises evaluating a frequency change of the output signal caused by the additional phase shift.

* * * * *